April 4, 1939.　　　　M. KOVENSKY　　　　2,153,256

ELECTRIC BAKING IRON

Filed March 18, 1937　　　　2 Sheets-Sheet 1

Inventor

Max Kovensky

By Lloyd W. Patel

Attorney

April 4, 1939.　　　M. KOVENSKY　　　2,153,256
ELECTRIC BAKING IRON
Filed March 18, 1937　　　2 Sheets-Sheet 2
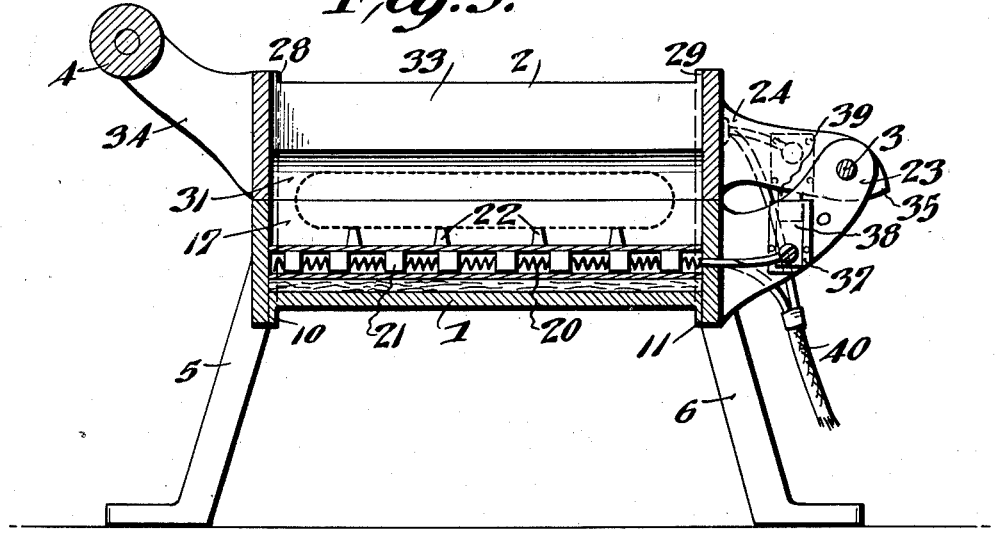
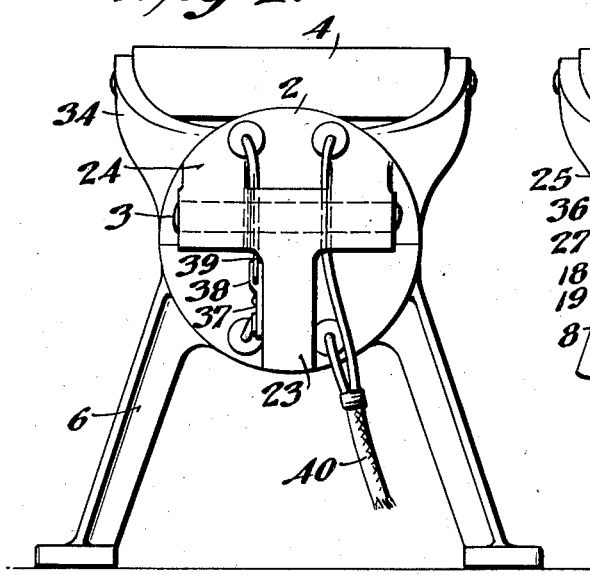
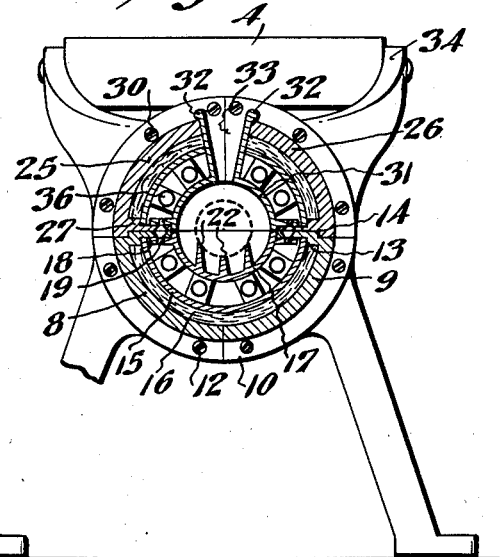
Inventor
Max Kovensky
By Lloyd W. Patch
Attorney Patented Apr. 4, 1939

2,153,256

UNITED STATES PATENT OFFICE 2,153,256

ELECTRIC BAKING IRON

Max Kovensky, Miami, Fla.

Application March 18, 1937, Serial No. 131,729

3 Claims. (Cl. 219—19)

My invention relates to improvements in electric baking irons, and particularly to a baking iron structure intended and adapted for use in encasing and baking a frankfurter sausage, or any other kind of sausage or meat product or also fruit such as bananas or the like, in a dough to produce a roll of baked dough in which the frankfurter or the like is encased; the construction being such that the frankfurter or the like is supported to be entirely encased within the dough as baked, and that an accompanying product or delicacy, such as perhaps cabbage or sauerkraut or the like can be applied in combination with the frankfurter or the like, and the combination can be covered with liquid dough and baked and then served.

An object of my invention is to provide a device of this character which is of simple and inexpensive construction, which can be used in any place where electric current is available, and which has the parts thereof so arranged and assembled that the structure will remain clean during use, and all exposed parts can be readily reached for cleaning, should this be required.

Another object is to so construct the device that two members are provided with cooperating and mating openings to form the cavity or receptacle in which the dough is baked, and one of the parts has means associated therewith to receive and retain the frankfurter or other article or product substantially centered within the opening or cavity so that it will be evenly coated or encased within the roll, and the roll is baked therearound.

A further object is to provide a structure with which the two members are hingedly connected together so that they can be readily and conveniently opened one from the other to give full access to the opening or cavity in which the baking operation is accomplished, for ready removal of the roll, and with which the parts are readily and expeditiously adjusted or moved to the opened and the closed positions and perfect registry of the parts is insured in the closed relation.

Still another object is to provide a baking iron of this character in which the heating is accomplished through electrically heated coils or elements, and with which the circuit connections to the coils are broken to thus prevent passage of any current when the parts of the iron are separated to give access to the baking opening or cavity.

Yet another purpose of my invention is to provide a device of the character set forth which has the parts thereof so constructed and associated and interfitted that they can be readily assembled and can be easily disassembled, should occasion require, and with which a maximum heating effect is attained and retained within the baking compartment through the use of a minimum consumption of current.

With the above and other objects in view, which will be apparent to those skilled in the art, and are inherent in the construction and use of the parts, my invention includes certain novel features of construction and combinations and arrangements of the parts which will be hereinafter set forth in connection with the drawings and then pointed out in the claims.

In the drawings:

Fig. 3 is a longitudinal vertical view taken substantially centrally from end to end through the device.

Fig. 4 is a view in end elevation.

Fig. 5 is a transverse vertical sectional view.

Figure 1:
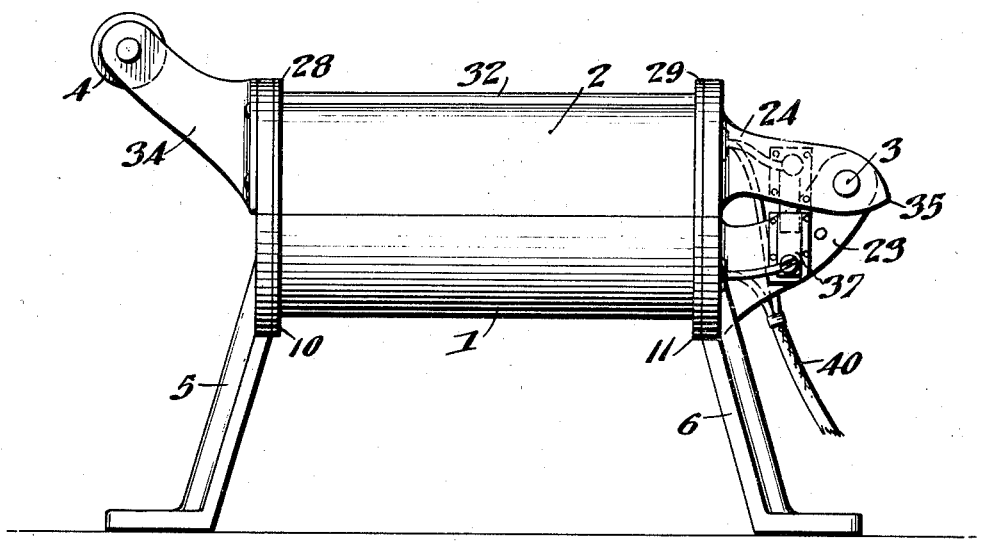
Figure 1 is a view in side elevation of an electric baking iron constructed in accordance with my invention.
Figure 2:
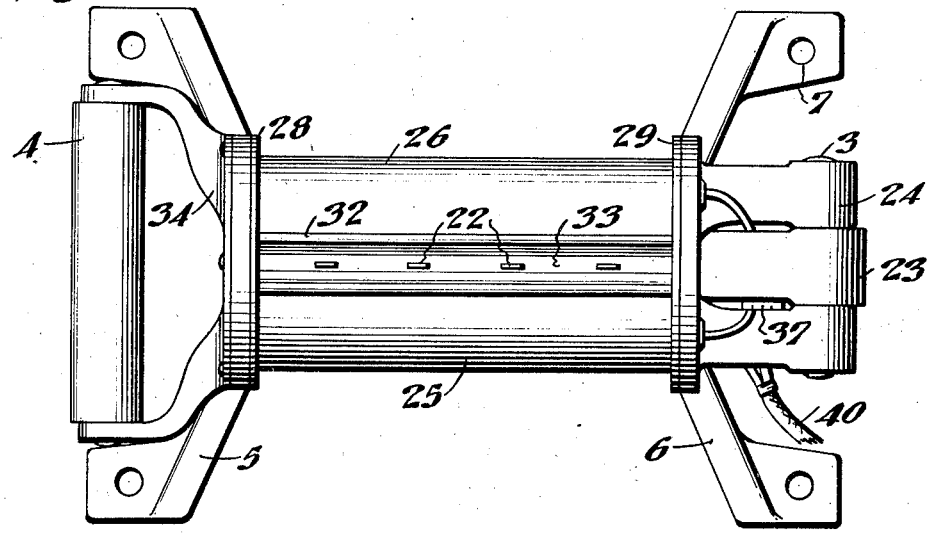
Fig. 2 is a top plan view.

My improved baking iron structure consists broadly of lower and upper members or portions 1 and 2 which are hingedly and swingably connected together at 3, the lower member or portion being in use ordinarily substantially stationary or immovable, and a handle being provided at 4 by which the upper member or portion 2 can be swung or opened upwardly around the hinge connection at 3.

The lower portion is mounted on front and rear legs 5 and 6, which legs are preferably spread to give a wide and stable support, and are provided with openings 7 through which fastenings may be inserted to secure and mount the device in a fixed position. Casing members 8 and 9, made of cast metal or other suitable material, have flange portions 10 and 11 at their ends, and screws or other fastenings 12 can be passed through openings in these flanges to secure and mount the same in conjunctioin with the leg members 5 and 6. These casing members 8 and 9 are so shaped as to form a substantially semi-tubular casing portion having its open side disposed upwardly and at their top edges the members 8 and 9 are provided with reentrant flange portions 13, which flange portions on their upper edges are rabbeted, as at 14. A casing member 15, also of substantially semi-tubular form, is preferably fitted within the opening formed by the casing members 8 and 9, and asbestos or other heat insulating material 16 is preferably introduced to prevent transmission or passage of heat to the casing members 8 and 9. A baking liner 17 is provided with side flange portions 18 which fit against the inner sides of the reentrant flange portions 13, and are secured thereto by means of screws or other fastenings 19. This baking liner 17 is spaced from the member 15 to provide clearance for reception of heating coils 20, which are preferably run through and supported by hanger hooks 21, of porcelain or other suitable material. Supporting rests 22 are placed to project upwardly from the baking liner 17 in substantially parallel relation and with their upper ends having a substantially trough-like form, so that a frankfurter or other article placed upon these supporting rests will be retained substantially centrally within the opening of the baking liner. As stated, these supporting rests 22 are arranged or formed to be substantially parallel so that the roll or article baked therein can be readily removed and the supporting points or rests will easily draw out of the baked material without leaving traceably large openings therein and without tearing or disturbing the structure of the baked dough.

A hinge bracket 23 extends from the rear end of the lower member or portion 1 and has bearing structure provided thereon for the hinge joint at 3, the upper member having cooperating hinge brackets 24.

This upper member or portion 2 has the side walls thereof made up of the shell or casing members 25 and 26, and these members can be made of cast metal or other suitable material. The shell or casing members 25 and 26 are provided with reentrant flanges 27, and have laterally extending end flanges 28 and 29 receiving fastenings 30 by which the shell or casing members are mounted or held in place. A baking liner 31, somewhat like the baking liner 17, is mounted and supported on the reentrant flanges 27 in a manner similar to the mounting of the liner 17, and the baking liners 31 and 17 cooperate to give or form a substantially cylindrical baking opening or cavity, with the supporting rest portions 22 extending upwardly from the bottom thereof to a desired distance or height. The baking liner 31 has dough trough extensions 32 at the upper side thereof so that a dough receiving or pouring spout 33 is provided to open into the baking space or cavity.

As stated, a handle 4 is provided to raise and lower and swing or manipulate the upper member or portion 2, and this handle is conveniently mounted and held by handle brackets 34. Through the medium of handle 4 the member 2 can be raised or swung up around the hinge mounting at 3, and extensions 35 are preferably provided to limit and stop movement of the member or portion 2 when it has been brought to the opened relation.

Heating coils 36, which can be similar in construction and mounting to coils 20 of the lower member or portion are mounted around the baking liner 31, and heat insulating material or members can be introduced outside of the heating coils to retain and conserve the heat therefrom so that a full measure of the heat will be absorbed by the baking liner 31.

These heating coils or elements can be constructed and formed in any desired and approved manner, and dielectric or non-conducting material can be introduced around the heating elements to prevent short circuiting or the transmission of current to outside or inside parts of the structure. It is desirable that the current be disconnected when the upper member or portion 2 is moved to the opened position, and this is readily accomplished through the use of a switch, generally indicated at 37, and positioned adjacent to the hinge mounting at 3. This switch structure has the double contact ends 38 carried by the hinge bracket 23 and knife switch members 39 carried by the hinge bracket portions 24, so that as the member or part 2 is swung open the switch portions are out of contact and as the member 2 is swung to the closed position the switch portions establish contacts to complete the circuit through the heating coils. Current is readily and conveniently supplied through a flexible cable or wire 40, or from any other desired source and in any other suitable manner.

As stated, the members 8 and 9 are preferably rabbeted at their edges, as at 14, and the adjacent edges of the members 25 and 26 are reversely rabbeted so that as the portion or member 2 is closed down to the position and relation shown in the drawings, the parts interfit to prevent spilling and loss of dough.

In the use of my device, the handle 4 will be grasped and the upper member 2 will be raised or swung up to give full access to the space within the baking liner 17, in which position the switch connection is broken and current is not supplied to heat the coils 20 and 36. A frankfurter or other sausage, a banana, or other article can then be readily and conveniently placed upon the supporting members 22, and is thus conveniently held and supported substantially centrally. As the member 2 is again swung down to the position shown in Figure 1, the switch portions 39 interfit with the switch portions 38 and a conducting circuit is provided through the heating coils 20 and 36. Dough or batter, or other suitable material to be baked, can be poured through the dough spout 33, and can be filled into the baking cavity or space up to the lower end of the nozzle or spout, or to any other height that may be desired. As the lowering of the member of part 2 effectively closes the circuit to the heating coils 20 and 36, heat is applied through the baking liner portions to bake the dough having the frankfurter centrally encased therein. Upon completion of the baking operation, the cover or upper portion 2 will be raised and then ready access may be had for removing the baked roll and the parts are left in position for placement of another frankfurter sausage, or the like.

While I have herein shown and described only certain specific embodiments of my invention and have mentioned and suggested only certain possible modifications, it will be appreciated that many changes and variations can be made in the form, construction, arrangement, assembly, and manner of use of the parts, without departing from the spirit and scope of my invention.

I claim:

1. An electric baking iron for baking a dough mixture around a frankfurter sausage comprising, upper and lower mold and baking members each provided with mating substantially semi-cylindrical recesses to provide a substantially cylindrical mold and baking recess of greater length and diameter than a sausage when the two members are fitted together, a supporting structure by which the lower member is mounted with its line of division in substantially a horizontal plane, hinge means by which the upper member is hingedly and swingably connected at one end upon the lower member, and a plurality of laterally spaced rows of supporting members within the recess of the lower member upstanding in substantially perpendicular relation with respect to the plane of separation of the two members and from the bottom of the recess to cradle and support and hold a frankfurter sausage against lateral shifting without penetration of the casing thereof and thus substantially center the frankfurter sausage within the baking recess, said upper member having a trough formation and opening at the top thereof through which dough can be poured to flow into the recess to fill on all sides around and encase the frankfurter sausage as thus supported and said supports due to lack of penetration of the casing of the frankfurter sausage permitting retention of moisture and juices therein and by reason of their perpendicular arrangement allowing removal of the baked product without tearing or breaking the dough around the supports.

2. An electric baking iron for baking a dough mixture around a frankfurter sausage comprising, upper and lower mold and baking members each provided with mating substantially semi-cylindrical recesses to provide a substantially cylindrical mold and baking recess of greater length and diameter than a sausage when the two members are fitted together, a supporting structure by which the lower member is mounted with its line of division in substantially a horizontal plane, hinge means by which the upper member is hingedly and swingably connected at one end upon the lower member, a plurality of laterally spaced rows of supporting members within the recess of the lower member upstanding in substantially perpendicular relation with respect to the plane of separation of the two members and from the bottom of the recess to cradle and support and hold a frankfurter sausage against lateral shifting without penetration of the casing thereof and thus substantially center the frankfurter sausage within the baking recess, said upper member having a trough formation and opening at the top thereof through which dough can be poured to flow into the recess to fill on all sides around and encase the frankfurter sausage as thus supported and said supports due to lack of penetration of the casing of the frankfurter sausage permitting retention of moisture and juices therein and by reason of their perpendicular arrangement allowing removal of the baked product without tearing or breaking the dough around the supports, a handle on said upper member positioned away from the hinge mounting thereof and by which said upper member can be swung to open and to closed positions, and heating means associated with said upper and said lower members around the recess thereof to supply baking heat entirely around the dough material as poured into the recess around a frankfurter sausage.

3. An electric baking iron for baking a dough mixture around a frankfurter sausage comprising, upper and lower mold and baking members each provided with mating substantially semi-cylindrical recesses to provide a substantially cylindrical mold and baking recess of greater length and diameter than a sausage when the two members are fitted together, a supporting structure by which the lower member is mounted with its line of division in substantially a horizontal plane, hinge means by which the upper member is hingedly and swingably connected at one end upon the lower member, a plurality of laterally spaced rows of supporting members within the recess of the lower member upstanding in substantially perpendicular relation with respect to the plane of separation of the two members and from the bottom of the recess to cradle and support and hold a frankfurter sausage against lateral shifting without penetration of the casing thereof and thus substantially center the frankfurter sausage within the baking recess, said upper member having a trough formation and opening at the top thereof through which dough can be poured to flow into the recess to fill on all sides around and encase the frankfurter sausage as thus supported and said supports due to lack of penetration of the casing of the frankfurter sausage permitting retention of moisture and juices therein and by reason of their perpendicular arrangement allowing removal of the baked product without tearing or breaking the dough around the supports, a handle on said upper member positioned away from the hinge mounting thereof and by which said upper member can be swung to open and to closed positions, electric heating coils carried by said lower member around the baking recess therein, electric heating coils similarly carried and arranged in the upper member, an electric current supply connection to the lower member, and switch means having cooperating parts thereof carried by the upper and the lower members to connect and complete an electric circuit through the heating coils of the upper and the lower members when the lower member is closed to the baking position and to break and open the circuit when the upper member is raised and opened.

MAX KOVENSKY.